(12) United States Patent
Kakinami et al.

(10) Patent No.: US 8,031,908 B2
(45) Date of Patent: Oct. 4, 2011

(54) OBJECT RECOGNIZING APPARATUS INCLUDING PROFILE SHAPE DETERMINING SECTION

(75) Inventors: Toshiaki Kakinami, Kariya (JP); Hiroyuki Watanabe, Nagoya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 705 days.

(21) Appl. No.: 12/088,499

(22) PCT Filed: Oct. 16, 2006

(86) PCT No.: PCT/JP2006/320572
§ 371 (c)(1),
(2), (4) Date: Mar. 28, 2008

(87) PCT Pub. No.: WO2007/046336
PCT Pub. Date: Apr. 26, 2007

(65) Prior Publication Data
US 2009/0052779 A1    Feb. 26, 2009

(30) Foreign Application Priority Data
Oct. 20, 2005    (JP) ................................. 2005-306100

(51) Int. Cl.
*G06K 9/00*    (2006.01)
(52) U.S. Cl. ........................ 382/104; 382/209; 382/103
(58) Field of Classification Search .................. 382/104, 382/100, 103, 209
See application file for complete search history.

(56) References Cited

U.S. PATENT DOCUMENTS

| | | | |
|---|---|---|---|
| 7,248,718 B2 * | 7/2007 | Comaniciu et al. ........... | 382/104 |
| 2006/0167633 A1 | 7/2006 | Satonaka et al. | |
| 2006/0291697 A1 * | 12/2006 | Luo ............................... | 382/104 |
| 2008/0010018 A1 | 1/2008 | Satonaka et al. | |
| 2009/0121899 A1 | 5/2009 | Kakinami et al. | |
| 2009/0208109 A1 | 8/2009 | Kakinami et al. | |

FOREIGN PATENT DOCUMENTS
EP    1 679 526 A1    7/2006
(Continued)

OTHER PUBLICATIONS
Japanese Office Action issued in Japanese Application No. 2005-306100 dated Sep. 28, 2010 (with partial translation) (3 pages).
(Continued)

*Primary Examiner* — Vu Le
*Assistant Examiner* — Claire X Wang
(74) *Attorney, Agent, or Firm* — Sughrue Mion, PLLC (57) ABSTRACT

There is provided an object recognizing apparatus capable of recognizing a shape of an object in a stable manner with a small amount of calculation, even when data of non-target object is mixedly contained.

The object recognizing apparatus includes an object detecting section, a shape model setting section 3, a conformance degree calculating section 4 and a profile shape determining section 5. The shape model setting section 3 extract arbitrarily samples of a group of samples detected by the object detecting section 1 and constituting surface shape information and then sets shape models. The conformance degree calculating section 4 calculates the conformance degree of each shape model. The setting of the shape model and calculation of conformance degree are effected up to a predetermined maximum number of times. The profile shape determining section 5 is configured such that if a conformance degree exceeding a first reference value exists, then, the shape model having this conformance degree exceeding the first reference value is determined at once as the profile shape.

4 Claims, 7 Drawing Sheets

FOREIGN PATENT DOCUMENTS

| | | |
|---|---|---|
| EP | 1 683 707 A1 | 7/2006 |
| EP | 1 852 713 A1 | 11/2007 |
| JP | 2002-228734 A | 8/2002 |
| JP | 2003-58998 A | 2/2003 |
| JP | 2003-194938 A | 7/2003 |
| JP | 2003-255047 A | 9/2003 |
| JP | 2003-271975 A | 9/2003 |
| JP | 2004-118757 A | 4/2004 |
| JP | 2006-189393 A | 7/2006 |
| JP | 2006-193014 A | 7/2006 |
| JP | 2006-234493 A | 9/2006 |
| JP | 2006-234494 A | 9/2006 |
| JP | 2006-276984 A | 10/2006 |
| JP | 2006-276985 A | 10/2006 |
| JP | 2007-30700 A | 2/2007 |
| JP | 2007-114057 A | 5/2007 |

OTHER PUBLICATIONS

Fischler, Martin A., et al., "Random Sample Consensus: A Paradigm for Model Fitting with Applications to Image Analysis and Automated Cartography," Communications of the ACM, Jun. 1981, vol. 24, No. 6, pp. 381-395.

\* cited by examiner

OBJECT RECOGNIZING APPARATUS INCLUDING PROFILE SHAPE DETERMINING SECTION

TECHNICAL FIELD

The present invention relates to an object recognizing apparatus for recognizing a profile shape of an object present around a movable body.

BACKGROUND ART

As an example of such apparatus as above, there is known an obstacle detecting apparatus disclosed in Patent Document 1 identified below. This apparatus is configured to detect an obstacle present around a vehicle (movable body) and then issue an alert. An apparatus prior to the invention of Patent Document 1 was configured to determine only a distance between a vehicle and an obstacle and issue an alert only when the determined distance is shorter than a predetermined distance. Therefore, this apparatus suffered the problem that with the alert based on the distance alone, it was difficult for a driver to determine which object around the vehicle was the obstacle. Whereas, the apparatus disclosed in Patent Document 1 includes a plurality of obstacle detecting sensors mounted on the vehicle for calculating the distance to the obstacle. And, based on the result of these calculations, the apparatus estimates whether the shape of the obstacle is linear (planar shape) or circular (convex shape) and displays the estimated shape.
Patent Document 1: Japanese Patent Application "Kokai" No. 2003-194938A (see P.2-3, FIGS. 1-7).

DISCLOSURE OF THE INVENTION

Problem to be Solved by Invention

The invention described in Patent Document 1 is useful for the user in that not only the distance to an obstacle, but also the shape of the obstacle is estimated. In actual determination; however, it often happens that the detection data obtained mixedly contains data resulting from detection of objects other than the detection target (obstacle). Such detection data concerning non-target objects will act as noise components in the shape estimation of the detection target, thus resulting in reduction in the estimation accuracy. Therefore, the stability in detecting e.g. an obstacle as a detection target cannot be said to be sufficient. If the apparatus is provided with a noise removing function, this would lead to increase in the amount of calculation required, thus inviting increase in the processing time period and/or enlargement of the apparatus disadvantageously.

The present invention has been made in view of the above-described problem. The object of the present invention is to provide an object recognizing apparatus capable of recognizing a shape of an object in a stable manner with a small amount of calculation, even when data of non-target object is mixedly contained.

Means to Solve the Problem

For fulfilling the above-noted object, according to the present invention, an object recognizing apparatus for recognizing an object present around a movable body, comprises:

an object detecting section for detecting surface shape information of the object present around the movable body;

a shape model setting section for extracting arbitrary samples, up to a predetermined number of times, from a group of samples together constituting said surface shape information and then setting a shape model based on said extracted samples;

a conformance degree calculating section for calculating a conformance degree of said each shape model relative to said sample group; and a profile shape determining section for determining the shape model as a profile shape, based on the calculated conformance degree of the shape model;

wherein said profile shape determining section is configured such that if a conformance degree greater than a first reference value is found, the shape model having said conformance degree is determined at once as said profile shape, irrespectively of said predetermined number of times;

whereas if no conformance degree greater than said first reference value is found, then, a shape model having a conformance degree which is greater than a second reference value smaller than said first reference value and which also is the greatest conformance degree of said conformance degrees obtained by said predetermined number of times is determined as said profile shape, and if no conformance degree greater than said second reference value is found, it is determined that no shape model corresponds to said profile shape.

According to this characterizing construction, a shape recognizing section extracts samples from the group of samples up to a predetermined maximum number of times and sets one shape model after another based on the extracted samples. Then, calculation is effected for obtaining a conformance degree of to what degree the sample group as a whole conforms to the set shape model and it is determined which shape model best conforms to the sample group.

In case the samples arbitrarily extracted contain "noisy" samples, the conformance degree between the set shape mode and the sample group is low. On the other hand, in case the shape model was determined without containing such noisy samples, the conformance degree is high. Accordingly, it is possible to recognize a profile shape of a target object with a small amount of calculation and with high accuracy, through elimination of noisy samples.

The shape recognizing section sets shape models based on a number of samples which number is much smaller than the total number of samples together constituting the sample group. Further, the conformance degree of the sample group relative to the shape model can be calculated geometrically with use of spatial coordinates of each sample. Therefore, the amounts of calculations required for the sample extraction and shape model setting can be small. Accordingly, even if different shape models are set repeatedly by the predetermined number of times and the conformance degrees are calculated based thereon, it is still possible to restrict increase in the total amount of calculation. As a result, the profile shape can be recognized with high accuracy.

Further, if a shape model having a conformance degree greater than the first reference value is found, then, the profile shape determining section of the shape recognizing section determines at once this shape model having the conformance degree greater than the first reference value, as the profile shape, irrespectively of the predetermined number of times. Therefore, in the course of calculating conformance degrees with setting different shape models for a plurality of times, if there exists a shape model having a high conformance degree exceeding the first reference value, the profile shape can be determined at once at this stage, thereby completing the process instantly. Consequently, the total amount of calculation can be even further restricted.

On the other hand, in case no conformance degree is found greater than the first reference value after setting of shape models by the predetermined number of times and subsequent calculations of the conformance degrees thereof, then, among these conformance degrees obtained by the predetermined number of times, a shape model, if any, having a conformance degree which is greater than a second reference value smaller than said first reference value and which also is the greatest conformance degree of said conformance degrees obtained by said predetermined number of times is determined as the profile shape. Further, if no conformance degree at all is found greater than the second reference value, then, it is determined that no shape model corresponding to the profile shape exists. With this, it is possible to restrict the possibility of recognizing a shape unsuitable as the profile shape after completion of the calculations for the predetermined number of times.

Further, according to another characterizing construction of the object recognizing apparatus relating to the present invention, in addition to the above-described construction, there is provided a further characterizing construction as follows. Namely, said profile shape determining section is further configured such that if a number of times when the conformance degrees relative to the different shape models obtained from the same sample group falls short of a third reference value which is lower than said second reference value, reaches a predetermined number of times of detection, it is determined that no shape model corresponding to the profile shape exists.

After calculation for the predetermined number of times on the sample group, it may be found, after all, that the conformance degrees of all shape models are smaller than the second threshold value. In such case, it is very likely that this particular sample group does not constitute the surface shape information of the target object. And, in such case, it is also very likely that the conformance degrees of the respective shape models extracted from such sample group all have very small values. Then, if the number of times when the calculated conformance degree is found smaller than the third reference value exceeds a predetermined number of times, it is possible to discontinue the evaluation on this unnecessary sample group, without continuing further calculations for the predetermined number of times. As a result, the total amount of calculation can be restricted.

BEST MODE OF EMBODYING THE INVENTION

Next, preferred embodiments of the present invention will be described with reference to accompanying drawings, with taking a case of one vehicle recognizing another vehicle as an example.

Figure 1:
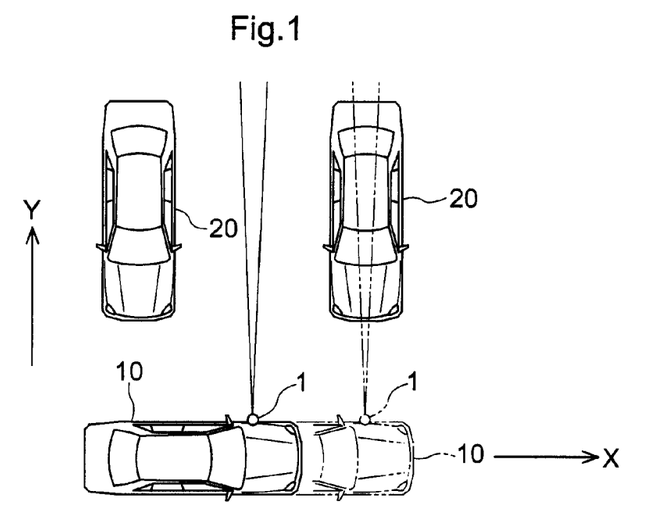

As shown in FIG. 1, a vehicle 10, as a movable body, mounts a distance sensor 1 (an object detecting section) directed laterally. This distance sensor 1 can be a point sensor, i.e. a single beam sensor, a sonar utilizing supersonic wave, etc. With using the distance sensor 1, the vehicle 10 determines a distance to another parked or stopped vehicle 20 (referred to as "a parked vehicle" hereinafter), as the vehicle 10 moves past aside this parked vehicle 20. More particularly, the distance sensor 1 determines the varying distances from the parked vehicle 20 in association with the movement relative thereto, thus obtaining "surface shape information" thereof. This operation corresponds to an object detecting step to be detailed later. And, the parked vehicle 20 corresponds to an "object" in this invention. For the sake of convenience, in FIG. 1, the distance sensor 1 is provided only on the left lateral side of the vehicle 10. Needless to say, the sensor 1 can be provided on each of the opposed lateral sides.

The surface shape information of the parked vehicle 20 obtained as above comprises discrete data obtained according to the varying distance of movement of the vehicle 10. Incidentally, the language "according to the varying distance of movement" is intended to be inclusive also of a meaning of "according to predetermined time interval". For instance, in case the vehicle 10 moves at a constant speed, it follows that the determination according a predetermined time interval is equivalent to determination according to the distance of movement. The moving speed, the moving distance and the moving time period of the vehicle 10 are all determined linearly. Therefore, any method can be employed as long as any such method can obtain the surface shape information substantially uniformly.

Incidentally, the distance sensor 1 can include a timer for determining the moving time period, an encoder for determining the moving distance, an associated sensor, such as a rotation sensor, for determining the moving speed. Alternatively, such sensors can be provided separately for obtaining the necessary information.

Figure 2:
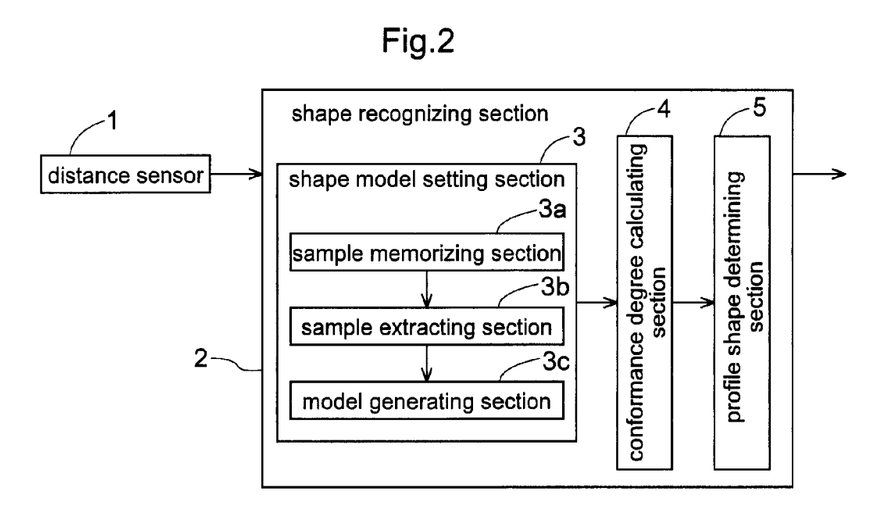

FIG. 2 is a schematic block diagram of the object recognizing apparatus relating to the present invention. A shape recognizing section 2 for recognizing a profile phase of the parked vehicle 20 is comprised of e.g. an electronic circuit such as a microcomputer. It is understood that the respective sections as shown constituting the shape recognizing section do not necessarily represent physically discrete electronic circuits. Rather, these sections are intended to represent functional processing portions. For instance, a single CPU may be employed for implementing programs corresponding to the functions of the respective sections.

The shape recognizing section 2 includes a shape model setting section 3, a conformance degree calculating section 4, and a profile shape determining section 5.

The shape model setting section 3 is configured for extracting arbitrary samples from a group of samples together constituting the surface shape information and then sets shape models based on the extracted sample(s). The conformance degree calculating section 4 is configured for calculating a conformance degree of each set shape model. The profile shape determining section 5 is configured for determining one shape model as a profile shape, based on the conformance degree(s) of the respective shape model(s).

First Embodiment

Next, there will be described a method by which the object recognizing apparatus relating to the present invention recognizes the parked vehicle 20 as an object. For facilitating understanding, discussions will be made separately to an object detecting step and a shape recognizing step subsequent thereto for recognizing a profile shape of the object.

[Object Detecting Step]

Figure 3:
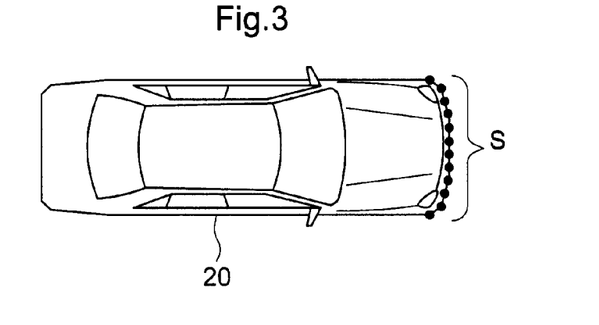

First, the object detecting step will be described. As shown in FIG. 3, with the distance sensor 1, the surface shape information S on the parked vehicle 20 is obtained. In this embodiment, the surface shape information comprises measurement data obtained discretely along the outer shape of a bumper portion of the parked vehicle 20. Here, the group of such discretely obtained data will be referred to as "a group of samples or sample group S". The sample group comprises a data set as the recognition target of the profile recognition. And, each datum or point constituting the data set will be referred to as "a sample (s)".

Figure 4:
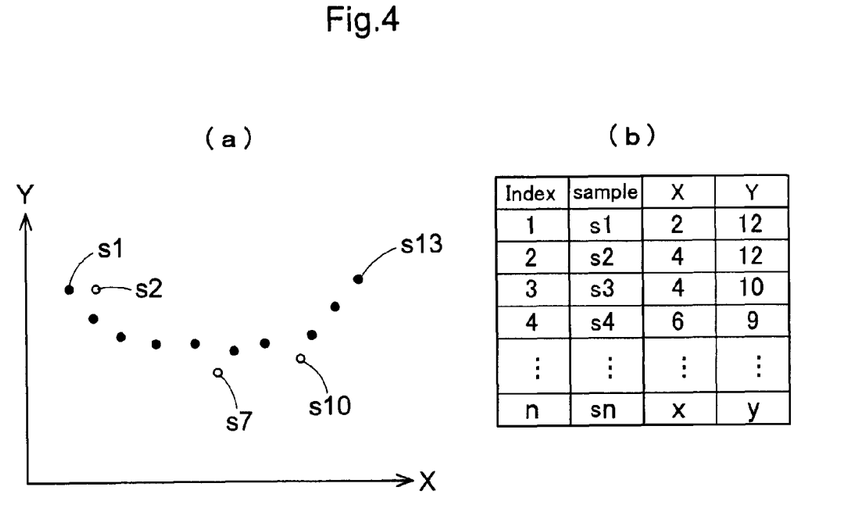

The surface shape information (sample group S) inputted to the shape recognizing section 2 are mapped on a two-dimensional orthogonal coordinate system having X and Y direction shown in FIG. 1 as axes thereof. Then, the information will be added with indices as shown in FIG. 4(*b*). The sample storing portion 3*a* can be constituted from e.g. a memory, a resister or the like incorporated in the microcomputer. Needless to say, any other storage medium such as a memory, a hard disc provided separately of the microcomputer, can be employed also.

For the sake of simplicity, not all samples (s) are shown in the figure. However, of the samples illustrated in FIG. 4(*a*), samples (s) denoted with black points will be referred to as "inliers" and samples (s) denoted with white spots will be referred to as "outliers", respectively. In the figure, the samples s1, s13, etc. are inliers and the samples s2, s7, s10 are outliers. Though will be detailed later, the inliers are samples which constitute the profile shape of the parked vehicle 20 and the outliers are so-called "noisy" samples which are deviated from the profile shape of the parked vehicle 20.

Next, with reference to a flowchart shown in FIG. 7, there will be described a procedure (shape recognizing step) for recognizing the profile shape of the parked vehicle 20, based on an obtained sample group S.

Figure 5:
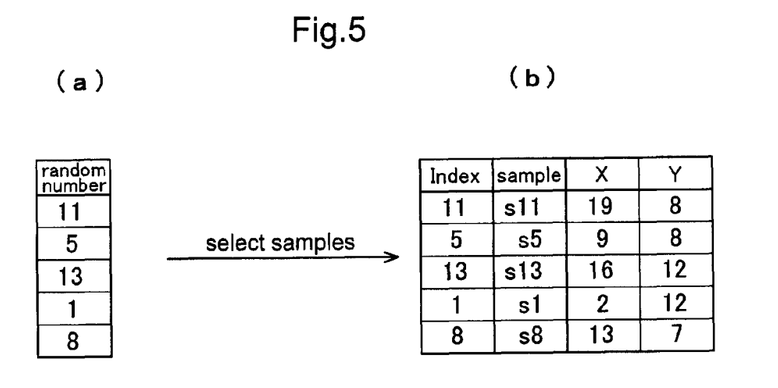

The sample extracting section 3*b* extracts some arbitrary samples (si) ("i" is an index number) from the sample group S (samples s1 through s13) (sample extracting step: FIG. 7, #1). As illustrated in FIG. 5, the samples (s) to be extracted will be determined randomly with using random numbers. For instance, the shape recognizing section 2 may be provided with a random number generator (not shown) for generating the random numbers (FIG. 5(*a*)). And, there will be extracted a sample (s1) having a generated random number as its index number (FIG. 5(*b*)). Incidentally, the random numbers may be generated by means of a random number generating program to be executed by the shape recognizing section 2 comprised of a microcomputer.

The minimum number of samples extracted by the sample extracting step will differ, depending on the shape of the target to be recognized. For instance, two points will be extracted in case the target shape is a straight line, whereas five points will be extracted in case the target shape is a quadric curve. In this embodiment, the bumper shape of the parked vehicle 20 is approximated as a quadric curve, so that five points are extracted. The group of individual data (samples (s)) extracted as above will be referred to as a "subset" as a concept corresponding to the data set.

Next, based on this subset (extracted samples (s)), the model generating section 3*c* will set a shape mode (shape model setting step: FIG. 7, #2). As shown by a solid line in FIG. 6, a first shape model L1 is set, based on the five extracted samples s1, s5, s8, s11 and s13. This shape model L1 can be easily obtained by a linear calculation with light calculating load. Alternatively, a plurality of kinds of template shapes may be prepared, so that the most appropriate one may be selected from these template shapes. Further alternatively, the shape model may be set, with using the least-square approach. Even when the least-square approach is employed, the computational load will still be low, thanks to the small number of samples.

Once the shape model L has been determined, the conformance degree calculating section 4 calculates a conformance degree of the shape model L (first shape model L1) relative to the sample group S (conformance degree calculating step: FIG. 7, #3).

Figure 6:
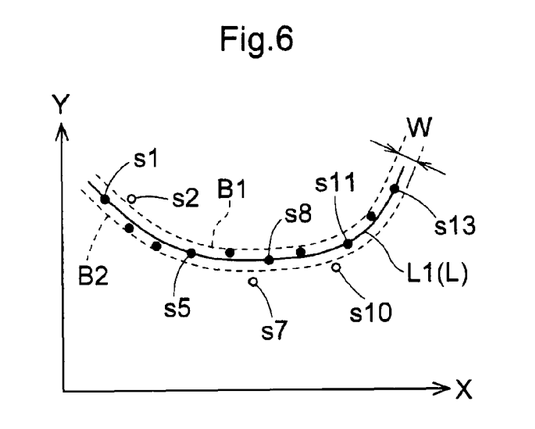

This conformance degree is obtained as follows. As shown in FIG. 6, by joining, along the shape model L, points spaced apart from each other by a predetermined distance in opposite directions normal to a tangent to the shape model L, a dot line B1 and a dot line B2 will be defined. Then, the area bound between these dot lines B1 and B2 will be defined as an effective area W. Then, the conformance degree will be calculated by determining how many or what ratio of the respective samples (si) constituting the sample group S are included within this effective area W.

With the effective area W for the first curve model L1 shown in FIG. 6, all samples (s) except the outliers samples s2, s7, s10 are included therein. Therefore, the conformance degree of the first shape model L1 relative to the sample group S will be determined as 77% (=$^{10}/_{13}$). That is, it may be said that the first shape model L1, with its samples (s) constituting the sample group S, has obtained a high support ratio, or "consensus" (77%).

Once the conformance degree has been determined as above, the process then proceeds to judge whether the currently obtained conformance degree is higher than the maximum conformance degree obtained so far (revision judging step: FIG. 7: #4*a*). If the calculation of the conformance degree is the first one made so far, then, the process judges whether the obtained conformance degree is higher than an initial value (e.g. zero) or not. If the currently obtained conformance degree is found higher, then, this conformance degree and the shape model corresponding thereto will be stored in a temporary storage section (not shown) such as a register (revision step: #4*b*). That is to say, the maximum conformance degree and the shape model corresponding thereto will be revised. The revision judging step and the revising step together will be referred to as a "conformance degree storing step" (#4). In the present case, the conformance degree 77% and the shape model L1 are stored.

Next, the profile shape determining section 5 judges whether this conformance degree is greater than a first reference value TH1 or not (first judging step: FIG. 7, #5). If the degree is judged as being higher than a first reference value TH1, then, the shape model L stored by the conformance degree storing step is now determined as a profile shape (profile shape determining step: FIG. 7, #8). For instance, in case the first reference value L1 is set to 75%, then, as the conformance degree of the first shape model L1 is 77% exceeding this first reference value TH1, this first shape model L1 is determined as the profile shape. That is to say, irrespectively of the predetermined number of times, the first shape model L1 having a conformance degree exceeding the first reference value will be determined as the profile model.

In the above, if the first reference value TH1 is set to 80%, the conformance degree of the first shape model L1 fails to reach this first reference value TH1. In this case, after a predetermined number of times judging step (#6) to be described later, the process will return to the operation at #1 of the flowchart. Then, the process will extract different samples (s) to form a new subset and will effect similar operations as above. The number of this repetition will be determined in advance as a predetermined calculation number of times (corresponding to "a predetermined number of times" in the present invention).

Figure 7:
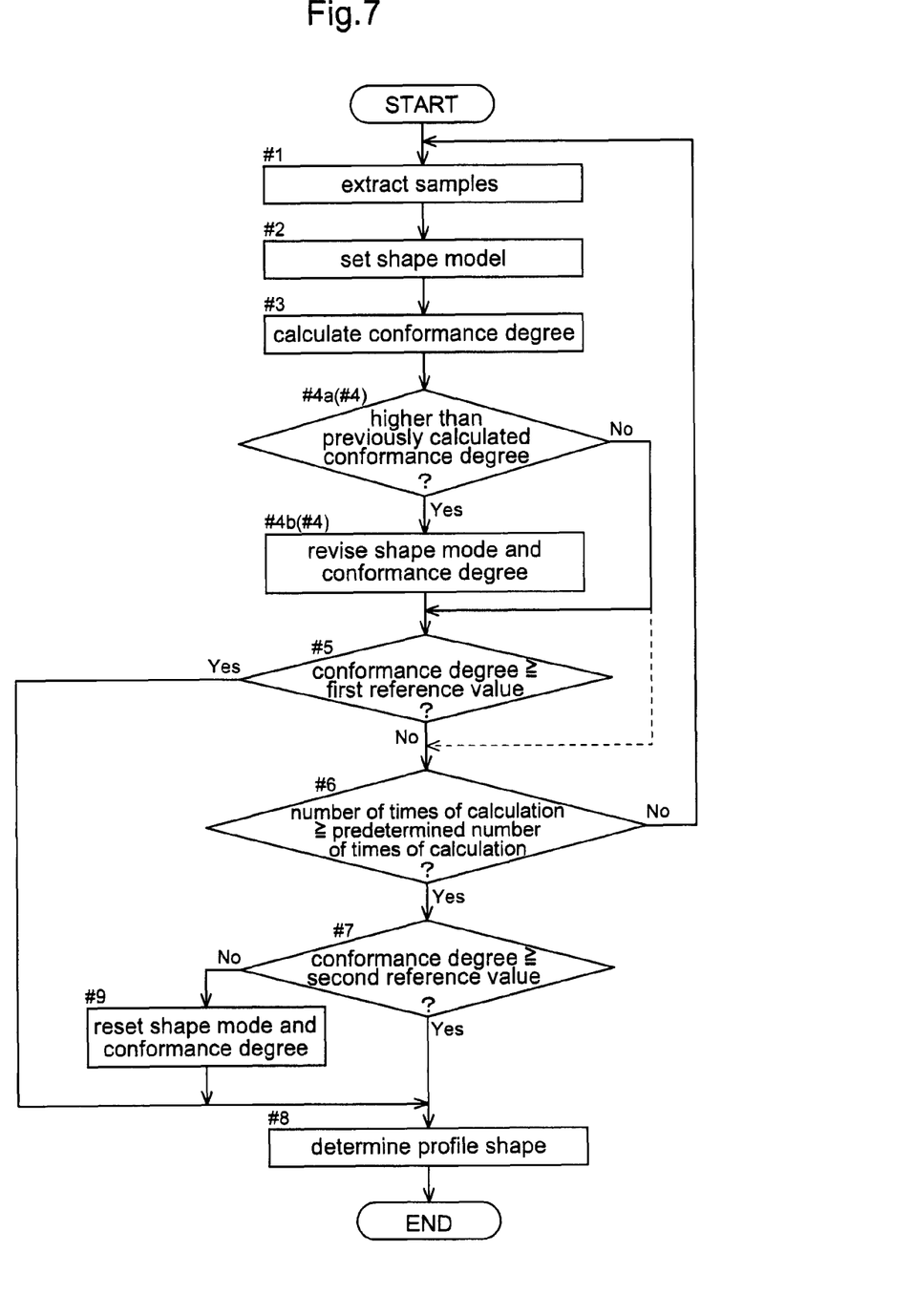

In case no conformance degree is found to exceed the first reference value TH1 even after the repetition of the operations of #1 through #4 (#1 through #6), by the predetermined calculation number of times, the process then moves to a second judging process (#7 in FIG. 7). That is to say, in this process, it is judged whether the maximum conformance degree stored in the temporary storing section is greater than a second reference value TH2 (e.g. 70%) which is smaller than the first reference value TH1. If this conformance degree is judged to be greater than the second reference value TH2, then, the shape model L stored in the temporary storing section (the shape model L corresponding to the maximum conformance degree) is determined as the profile shape (profile shape determining step: #8). If no conformance degree is found greater than the second reference value TH2, then, the conformance degree and the shape model L stored in the temporary storing section will be reset (conformance degree initializing step: #9). As a result, at the profile shape determining step (#8), the process will determine that no correspondence is found, i.e. no target object (e.g. the parked vehicle 20) is present.

Figure 8:
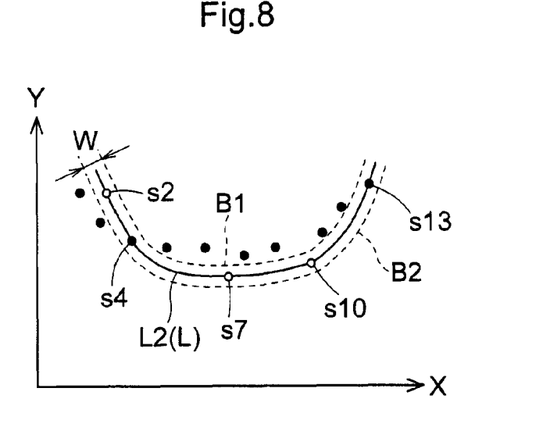

In the shape model L (second shape model L2) shown in FIG. 8, there are extracted samples s2, s4, s7, s10 and s13, as a subset. As described hereinbefore, the samples s2, s7 and s10 are so-called, noisy samples which are deviated from the profile shape of the parked vehicle 20. Therefore, as seen from the viewpoint of the profile shape of the parked vehicle 20, these are samples which should be defined as outliers. For this reason, as illustrated in FIG. 8, there are many samples which are deviated from the effective area W of the second shape model L2. If its conformance degree is calculated just like for the first shape model L1, the conformance degree will be calculated as 38% (=5/13). That is, it may be said that as compared with the first shape model L1, the second shape model L2, with the respective samples (s) constituting the sample group S, does not obtain consensus with high support ratio.

In case neither the first shape model L1 nor the second shape model L2 exceeds the first reference value TH1, at the conformance degree storing step (#4), the first shape model L1 has been stored. As a result, through the second judging step (#7), the process determines the first shape model L1 as the profile shape at the profile shape determining step (#8).

In the first shape model L1 determined as the profile shape as above, the noisy samples s2, s7, s10 were not used and eliminated as outliers therefrom. That is, with such small amount of calculation as described above, even when the sample group contains mixedly non-detection target data (outliers), such data can be eliminated and the shape of object can be recognized in a stable manner.

In the present embodiment, the sample group S is constituted from thirteen samples (s), just for the sake of easier understanding. Therefore, it is understood that in the present invention, the number of samples, the values of the first reference value TH1 and the second reference value TH2, etc. are not particularly limited.

[Advantageous Effect Over Conventional Method]

Conventionally, there have been proposed a variety of methods for calculating a profile shape from a sample group S, without using such method as described above. For instance, there has been proposed a method using the Hough conversion which is suitable in particular for recognition of a straight line. The Hough conversion, as well-known, utilizes the characteristics that straight lines present on an orthogonal coordinate system intersect at one point on a polar coordinate system ($\rho \cdot \theta$ space). Its conversion formula is as follows.

$$\rho = X \cdot \cos \theta + Y \cdot \sin \theta$$

As may be understood from the above formula, if one attempts to extend the range of $\phi$ and/or $\theta$ or obtain higher resolution, this will result in corresponding increase in the amount of calculation. That is, a large capacity will be required for the memory as the primary storing section and the number of calculations required will be increased also.

On the other hand, according to the recognizing method of the present invention, the memory capacity required is small and the amount of calculation required is also small. So, the calculation time will be short as well.

It may be said in general that a shape model L set based on a small number of samples does not represent an accurate profile shape. According to the present invention; however, the conformance degree between a shape model L and all samples of a sample group S is evaluated, so that all samples are evaluated consequentially. Therefore, it may be said that the shape model L can represent (recognize) a profile shape substantially accurately. This ability of reproduction of a profile shape by a shape model L set from a small number of samples constituting a subset contributes significantly to reduction in the amount of calculation.

[Processing Time Reducing Effect 1]

Figure 9:
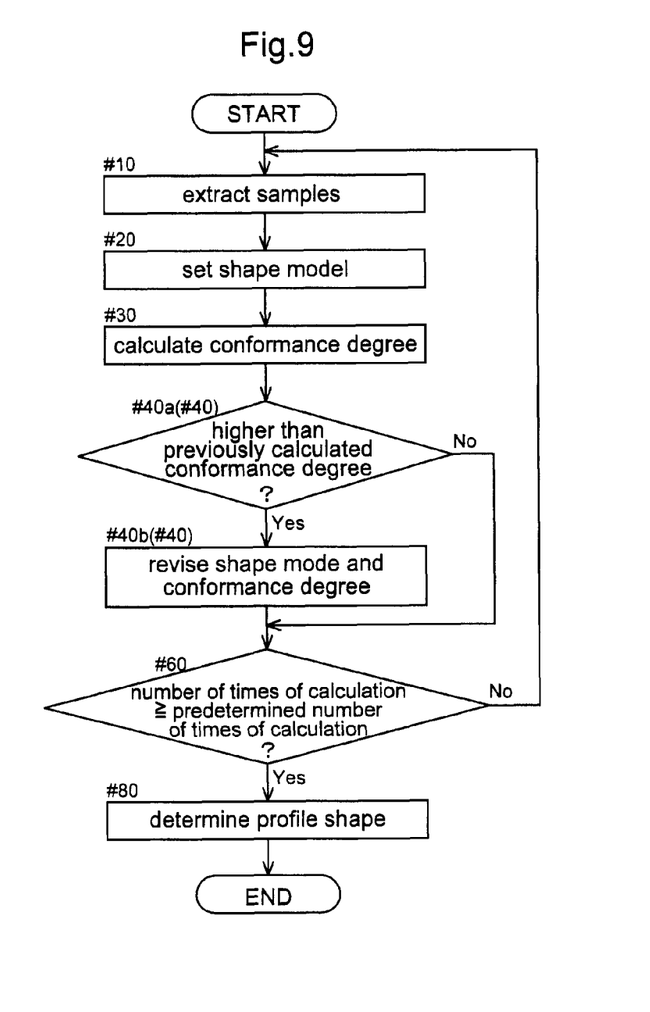
Figure 10:
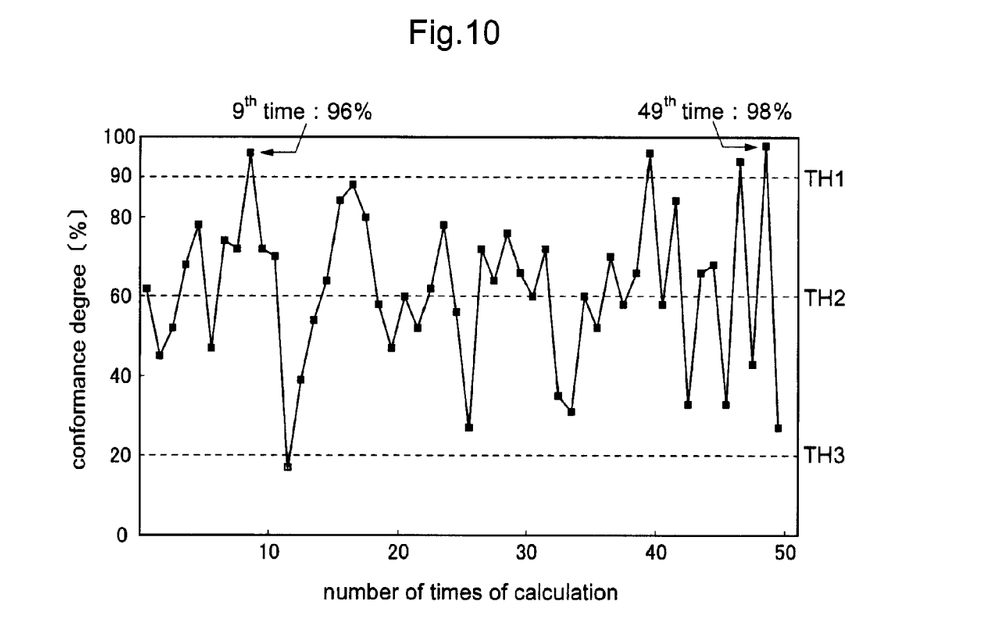

As described above, in the flowchart illustrated in FIG. 7, the execution of the first judging step (#5) enables reduction in the processing time generally believed necessary, thus enabling high speed processing. Next, the processing time reducing effect by the present invention will be explained. FIG. 9 is a flowchart illustrating a conventional processing, in comparison with the flowchart of FIG. 7. FIG. 10 is a scatter diagram showing result obtained when conformance degrees of different shape models L set based on a same sample group S were calculated 50 times (the number of calculations: 50 times). Note that this scatter diagram is shown as a line plot for clarifying the order of calculations.

Now, there will be discussed a case when calculations are carried out according to the flowchart shown in FIG. 9. Until it is confirmed at a predetermined number of times judging step (#60) that the number of times of calculation has reached 50 times, the process from the sample extracting step (#10) to the conformance degree storing step (#40) is repeated 50 times. Then, at the profile shape determining step (#80), a shape model L having the highest conformance degree is determined as the profile shape. In this example, 98% conformance degree obtained by the $49^{th}$ calculation is the maximum value of all. Therefore, the shape model L set at the $49^{th}$ time is determined as the profile shape.

Incidentally, the process corresponding to the second judging step (#7) was omitted for the purpose of facilitating explanation.

Next, there will be discussed a case where the calculations are carried out according to the flowchart of FIG. 7, i.e. a case where the inventive method is employed. Here, the first reference value TH1 is set to 90% and the second reference value TH2 is set to 60%. Until it is confirmed at the predetermined number of times determining step (#6) that the number of calculates has reached 50 times, the process checks, at the first judging step (#5), presence of a shape model L having a conformance degree exceeding the first reference value TH1. In this example, the shape model L found to have a conformance degree of 96% as the $9^{th}$ calculation corresponds to such shape model. Hence, at the profile shape determining step (#8), this shape model L is determined as the profile shape.

Namely, as compared with the conventional processing illustrated in FIG. 9, the profile shape can be determined in about 9/50 amount of time. Strictly, the judgment at the first judging step (#5) takes slightly longer, but a substantial time reduction effect can be obtained as a whole. It is highly probalistic at which time of calculation a conformance degree exceeding the first reference value TH1 is obtained. However, this number of times too will be distributed statistically.

Therefore, more speed-up effect can be obtained than the case of effecting calculations by the predetermined times of calculations entirely.

In the above-described example, the difference of conformance degree is 2%. With setting of the first reference value TH1 to an appropriate value, the difference of shape model L due to difference in conformance degree will not be so problematic. Such appropriate value will be determined, in consideration of utility such as a mixing ratio of outliers in the sample group S. The mixing ratio of outliers can be determined, in consideration of characteristics of the target object, the characteristics of the object detecting section 1 for detecting the surface shape information of the object, the environment at the time of detection (temperature, brightness of ambience, time, weather condition), etc. That is, this need not be a permanently fixed value, but can be varied as needed during the operation of the object recognizing apparatus. The same as above can be said for the second reference value TH2.

Incidentally, if the result of the revision judging step (#4a) is "NONE", there is no need to proceed to the first judging step (#5) as indicated by the solid line in FIG. 7. As indicated by the dot line, the first judging step (#5) can be skipped. Unless a conformance degree is determined greater than the previously obtained conformance degree, the conformance degree will not exceed the first reference value TH1. This is because if the conformance degree exceeded the first reference value TH1, such conformance degree would have exceeded the first reference value TH1 at the time of the previous time already.

[Second Embodiment and Processing Time Reducing Effect 2]

Figure 11:
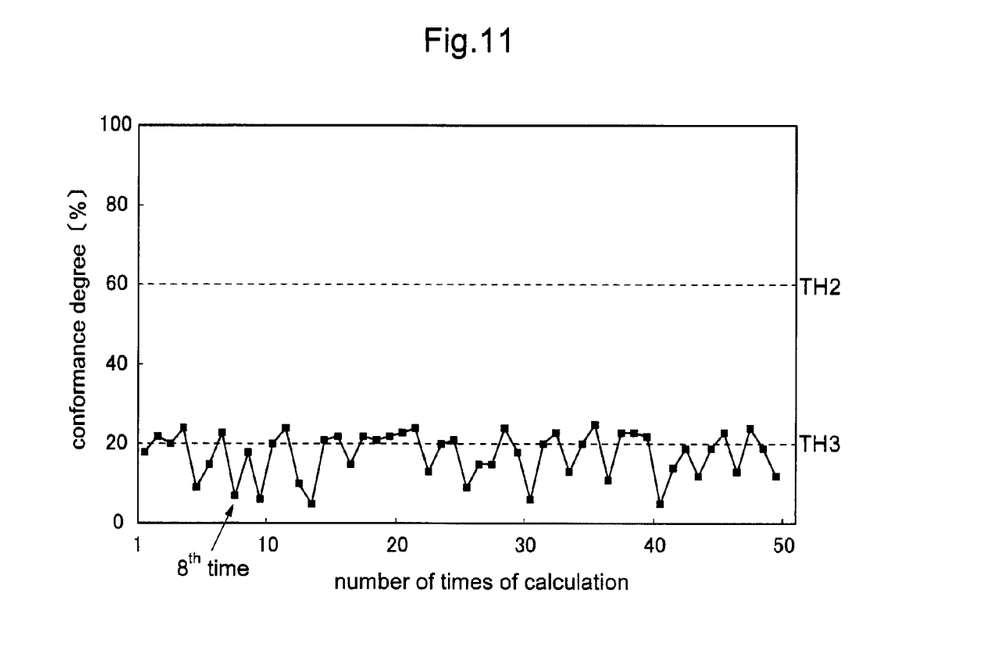

FIG. 11 is a scatter diagram showing result obtained when conformance degrees of different shape models L set based on a certain sample group S were calculated 50 times. This sample group S comprises a sample group when surface shape information of an object was not detected with accuracy, or no target object exists.

As may be apparent from FIG. 11, no conformance degree is found exceeding the second reference value TH2, let alone the first reference value TH1. Further, in the case of the scatter diagram shown in FIG. 10, the conformance degrees are distributed widely from low degrees to high degrees. Whereas, in the scatter diagram shown in FIG. 11, the conformance degrees are concentrated in the lower degree side.

In the case of the sample group S having the conformance degrees such as those shown in FIG. 11, if the calculation operation is carried out according to the flowchart shown in FIG. 7, this will result in eventual determination of "NO CORRESPONDENCE FOUND". More particularly, after the 50 times of repetition as the predetermined number of times of calculation, the process will go through the second determining step (#7) to provide the result of "NO CORRESPONDENCE FOUND". The process will expend the maximum amount of processing time, though not being able to determine any shape model L as the profile shape.

Then, with making note of the characteristics of the sample group S exhibiting such conformance degrees as shown in FIG. 11, the process will set a third reference value TH3 so as to stop the process earlier, thereby reducing the processing time.

Figure 12:
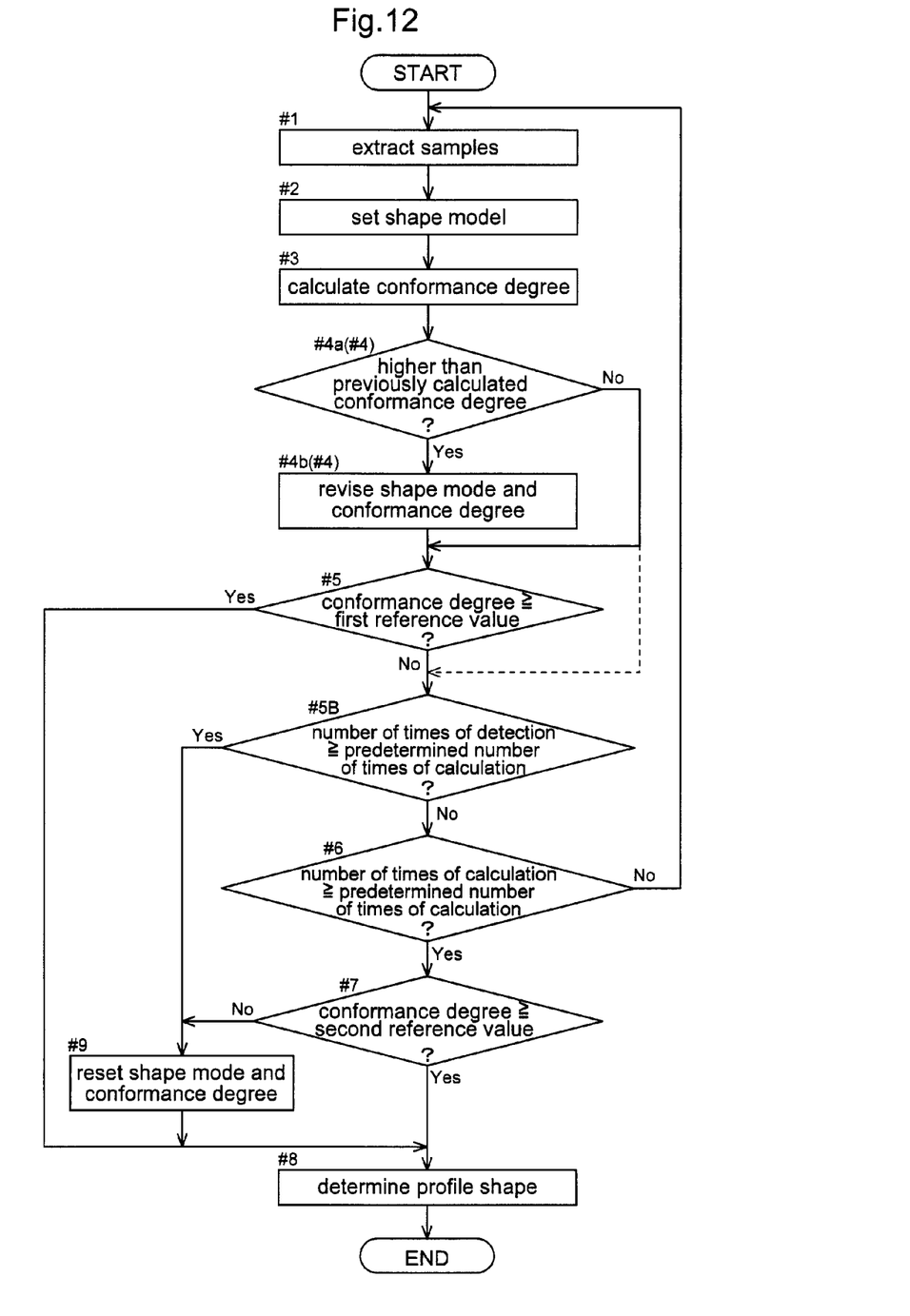

FIG. 12 is a flowchart relating to a second embodiment. In this, a third judging step (#5B) is added between the first judging step (#5) and the predetermined number of time judging step (#6) shown in FIG. 7. The invention is not limited to this embodiment. For instance, the third judging step (#5B) may be added between the conformance degree storing step (#4) and the first judging step (#5).

At the third judging step (#5B), it is judged whether the number of times (the number of times of detection) when the conformance degrees were found lower than the third reference value TH3 has reached the predetermined number of times or not. And, if the number has reached the predetermined number of times, then, setting and calculation of a conformance degree of any further shape model L is discontinued, and the stored shape models L and the stored conformance degrees are reset (#9). Then, it is determined that no shape model L corresponding to the profile shape exists in this sample group S (#8).

In the case of the example shown in FIG. 11, the third reference value TH20 is set to 20% and the predetermined number of times of detection is set to 5 times. In this example, the conformance degrees at the $1^{st}$ time (18%), the $3^{rd}$ time (20%), the $5^{th}$ time (9%), the $6^{th}$ time (15%), and the $8^{th}$ time (7%) are all lower than 20%. Therefore, in the $8^{th}$ calculation operation, it is determined that the detection time has reached 5 times (predetermined number of detection) and that there exists no shape model L corresponding to the profile shape. That is to say, as compared with the process shown in FIG. 7, it is possible to discontinue the process for one sample group S within about 8/50 of time.

Incidentally, the values of the third reference value TH3, the predetermined number of times of detection are determined appropriately in consideration with the utility, just like the first reference value TH1.

[Exemplary Uses of Recognition Result]

Figure 13:
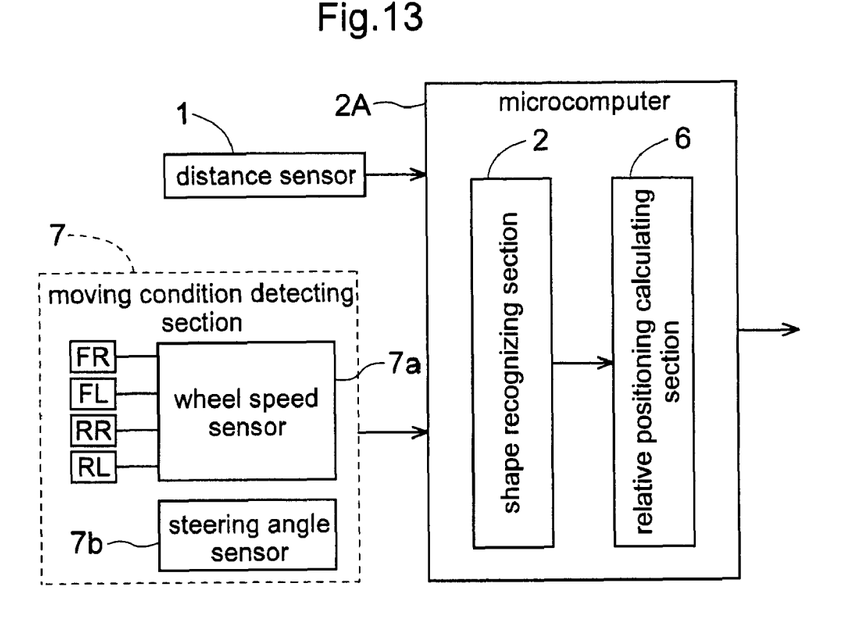

Exemplary uses of the result of the above-described recognition of a profile shape of an object will be described. As shown in FIG. 13, within a microcomputer 2A, there are provided a shape recognizing section 2 and a relative positioning calculating section 6. The shape recognizing section 2 recognizes a shape profile, i.e. the bumper shape, of the parked vehicle 20 as seen from the vehicle 10. In this recognition, as surface shape information of the parked vehicle 20 is obtained by using the distance sensor 1, the information regarding the distance between the vehicle 10 and the parked vehicle 20 is obtained at the same time. Then, with using distance information and the profile shape, the relative arrangement calculating section 6 calculates relative positioning between the vehicle 10 and the parked vehicle 20.

Figure 14:
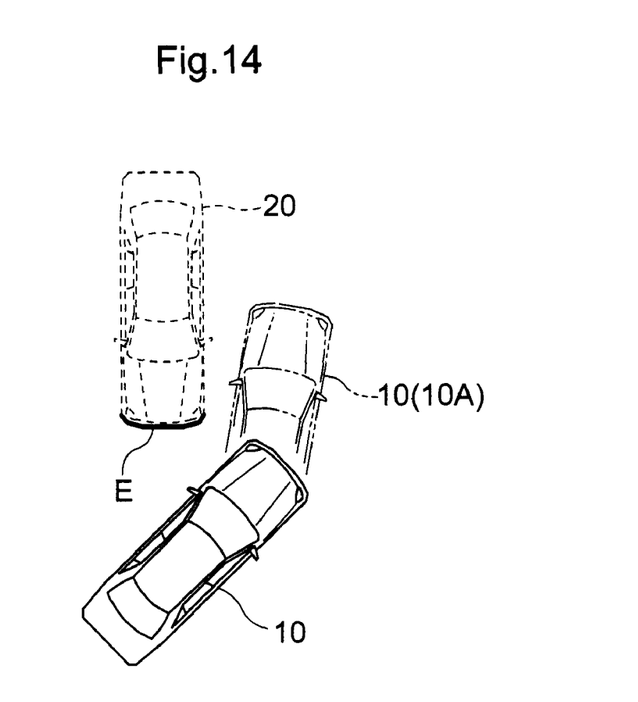

In the above, the language "relative positioning" refers to relative positions between respective components of the vehicle 10 and respective components of the parked vehicle 20. The outer shape of the vehicle 10 is known as its own shape. And, the profile shape of the parked vehicle 20 as seen from the vehicle 10 has been recognized as described above. With these, the relative positioning calculating section 6 calculates the relative positioning between the vehicle 10 and the parked vehicle 20 as illustrated in FIG. 14. Incidentally, although the parked vehicle 20 as a whole is denoted with dotted lines for the purpose of facilitating understanding, in actuality, the relative positioning between the recognized profile shape E and the vehicle 10 will be calculated. Needless to say, in case a profile shape E including other portions of the parked vehicle 20 have been recognized, relative positioning relative to a plurality of portions of the parked vehicle 20 can be calculated.

The relative positioning can be displayed on an alarm device such as a display. In case the vehicle 10 mounts a navigation system or the like, its monitor can be used also for displaying the positioning. For this displaying (alarming), the outer shape of the vehicle 10 and the recognized profile shape E may be displayed. Or, based on the profile shape E, the entire parked vehicle 20 may be displayed as a graphic symbol or icon, thus displaying the relative positioning between the vehicle 10 and the parked vehicle 20.

Further, instead of the visual alarming described above, a voice (including sound) alarm can be provided by using e.g. a buzzer, a chime, etc. Some navigation systems have a voice guidance function. Then, this vide guidance function can be utilized also as the above. These devices, such as a buzzer, a chime, a navigation system, et. are included in the "alarm device".

Further, as shown in FIG. 13, if there is provided a moving condition detecting section 7 for detecting a moving condition of the vehicle 10, such as a wheel speed sensor 7a, a steering angle sensor 7b, etc, then, it becomes possible to calculate also a relative positioning in a near future. It becomes possible not only to learn the present relative positioning where the profile shape has been recognized, but also to estimate (predict) relative positioning in future. FIG. 14 shows an example of relative positioning between the vehicle 10 and the profile shape E of the parked vehicle 20 calculated in the manner described above. Mark 10A denotes a near future position of the vehicle 10, that is, the estimated (predicted) position.

In the above, the wheel speed sensor 7a is a rotation sensor using e.g. a Hall IC provided at each wheel portion (front right FR, front left FL, rear right RR, rear left RL) of the vehicle 10. The steering angle sensor 4b is a sensor for detecting a rotational angle of a steering wheel or a tire of the vehicle 10. Alternatively, this can be a computational device for computing a steering angle based on result of measurements by the wheel speed sensors 4a at the respective wheel portions.

Other Embodiments

The object detecting section is not limited to the above-described distance sensor 1 shown in FIG. 1 configured for detecting surface shape information of the parked vehicle 20 in association with movement of the vehicle 10.

The distance sensor 1 can be configured for outputting surface shape information regardless of movement of the vehicle 10, so that output information may be selected for each moving distance, each elapsed time in a subsequent information processing. Further, there may be provided a scanning section for scanning a wide-angle area relative to the parked vehicle 20 irrespectively of movement of the vehicle 10, so that the surface shape information may be detected based on the scanning information obtained. That is to say, it is possible to employ not only a point sensor, but also any other sensor, such as a one-dimensional sensor, a two-dimensional sensor, a three-dimensional sensor, capable of obtaining signals (surface shape information) reflecting the shape of the object.

One example of the one-dimensional sensor is a scanning type laser sensor. This sensor scans an object (parked vehicle 20) radially from the sensor position. Then, based on reflection of laser wave from each position of the object, distribution of distances is determined. If the azimuth θ at the time of the emission of the laser wave is detected in advance, it is possible to obtain surface shape information like the one shown in FIG. 3 and to map it in an X-Y orthogonal coordinate system.

As other examples of the one-dimensional sensor, a supersonic type radar, an optical type radar, an electromagnetic type radar, a trigonometrical type range finder, etc. may be employed.

One example of the two-dimensional sensor is a scanning type radar capable of scanning in the horizontal and vertical directions. With use of this scanning type radar, it is possible to obtain information regarding the shape of the target object in the horizontal direction and the shape of the same in the vertical direction.

Further, as well-known examples of the three-dimensional sensor, there is a camera using such an image inputting sections as a CCD (Charge Coupled Device), a CIS (CMOS Image Sensor). Then, from image data obtained by such camera as above, various kinds of characteristic amounts such as profile line information, intersection point information, etc. can be extracted, thereby obtaining information relating to the surface shape.

The same can be said for the three-dimensional sensor. For instance, information relating to shape can be obtained by using image data or like obtained through stereoscopic photography.

In the above, the embodiments of the present invention have been described by way of examples of a method, an apparatus for recognizing a profile shape of a parked vehicle 20 as an object and their additional characterizing features. This "object" is not limited to such an obstacle as a parked vehicle, a building, etc., but can be a variety of other objects such as a cruising lane of a road, a stop line, a parking lot, etc. Namely, the recognition target is not limited to a profile shape of a three-dimensional object. The invention may be applied to shape recognition of a planar pattern also.

INDUSTRIAL APPLICABILITY

The present invention may be applied to an object recognizing apparatus for recognizing an object such as a motorcar, a robot, which is present around a movable body.

BRIEF DESCRIPTION OF THE DRAWINGS

FIG. 1 an explanatory view illustrating a case where a vehicle mounting an object recognizing apparatus according to the present invention recognizes another vehicle, FIG. 2 a block diagram schematically showing the construction of the object recognizing apparatus according to the present invention, FIG. 3 an explanatory view sowing result of measurement of surface shape information of a parked vehicle, FIG. 4 a scatter diagram showing the measurement results shown in FIG. 3 as being mapped on a two-dimensional orthogonal coordinate system, FIG. 5 an explanatory view illustrating a method of extracting samples arbitrarily from the sample group shown in the scatter diagram of FIG. 4, FIG. 6 an explanatory view illustrating a principle of calculating a conformance degree of a first shape model set based on samples arbitrarily extracted from the sample group shown in the scatter diagram of FIG. 4, relative to the sample group, FIG. 7 a flowchart for explaining an inventive method (first embodiment) for recognizing a profile shape from the sample group shown in the scatter diagram of FIG. 4, FIG. 8 an explanatory view illustrating a principle of calculating a conformance degree of a second shape model set based on samples arbitrarily extracted from the sample group shown in the scatter diagram of FIG. 4, relative to the sample group, FIG. 9 a flowchart for explaining a conventional method for recognizing a profile shape from the sample group shown in the scatter diagram of FIG. 4, FIG. 10 a scatter diagram showing an example of result obtained when conformance degrees of different shape models L set based on a same sample group were calculated 50 times, FIG. 11 a scatter diagram showing another example of result obtained when conformance degrees of different shape models L set based on a same sample group were calculated 50 times, FIG. 12 a flowchart for explaining the inventive method (second embodiment) for recognizing a profile shape from the sample group shown in the scatter diagram of FIG. 4, FIG. 13 a schematic block diagram of a system using the object recognizing apparatus according to the present invention, and FIG. 14 an explanatory view illustrating a relative positioning relationship between a vehicle mounting the apparatus of FIG. 13 and a profile shape of another vehicle.

DESCRIPTION OF REFERENCE MARKS 1 distance sensor (object detecting section)
2 shape recognizing section
3 shape model setting section
4 conformance degree calculating section
6 profile shape determining section
S sample group
s samples

The invention claimed is:

1. An object recognizing apparatus for recognizing an object present outside a movable body, comprising:
    an object detecting section for detecting surface shape information of the object present outside the movable body;
    a shape model setting section for extracting arbitrary samples, up to a predetermined number of times, from a group of samples together constituting said surface shape information and then setting a shape model based on said extracted samples;
    a conformance degree calculating section for calculating a conformance degree of said each shape model relative to said sample group; and
    a profile shape determining section for determining the shape model as a profile shape, based on the calculated conformance degree of the shape model;
    wherein said profile shape determining section is configured such that if said conformance degree greater than a first reference value is found, the shape model having said conformance degree greater than the first reference value is determined at once as said profile shape, irrespectively of said predetermined number of times;
    whereas, if no conformance degree greater than said first reference value is found, then, a shape model having a conformance degree which is greater than a second reference value smaller than said first reference value and which also is the greatest conformance degree of said conformance degrees obtained by said predetermined number of times is determined as said profile shape, and
    if no conformance degree greater than said second reference value is found, it is determined that no shape model corresponds to said profile shape.

2. The object recognizing apparatus according to claim 1, wherein said profile shape determining section is further configured such that if a number of times when the conformance degrees relative to the different shape models obtained from the same sample group falls short of a third reference value which is lower than said second reference value, reaches a predetermined number of times of detection, it is determined that no shape model corresponding to the profile shape exists.

3. The object recognizing apparatus according to claim 1, wherein the movable body is a vehicle.

4. The object recognizing apparatus according to claim 2, wherein the movable body is a vehicle.

* * * * *